(12) United States Patent
Goodridge et al.

(10) Patent No.: US 11,379,622 B2
(45) Date of Patent: Jul. 5, 2022

(54) MANAGING PRIVILEGE DELEGATION ON A SERVER DEVICE

(71) Applicant: Avecto Limited, Manchester (GB)

(72) Inventors: John Goodridge, Cheshire (GB); Thomas Couser, Lancashire (GB)

(73) Assignee: AVECTO LIMITED, Manchester (GB)

( * ) Notice: Subject to any disclaimer, the term of this patent is extended or adjusted under 35 U.S.C. 154(b) by 702 days.

(21) Appl. No.: 16/259,113

(22) Filed: Jan. 28, 2019

(65) Prior Publication Data
US 2019/0236293 A1 Aug. 1, 2019

(30) Foreign Application Priority Data

Jan. 31, 2018 (GB) ...................................... 1801568

(51) Int. Cl.
*G06F 21/62* (2013.01)
*G06F 21/12* (2013.01)
(Continued)

(52) U.S. Cl.
CPC ........ *G06F 21/629* (2013.01); *G06F 9/44526* (2013.01); *G06F 9/468* (2013.01);
(Continued)

(58) Field of Classification Search
CPC .... G06F 21/629; G06F 9/44526; G06F 9/468; G06F 21/126; G06F 21/53;
(Continued)

(56) References Cited

U.S. PATENT DOCUMENTS 5,881,225 A  3/1999  Worth
5,991,542 A  11/1999  Han et al.
(Continued)

FOREIGN PATENT DOCUMENTS

EP  2750035 A1  7/2014
GB  2486528 B   9/2016
(Continued)

OTHER PUBLICATIONS

Subashini, "A survey on security issues in service delivery models of cloud computing", Jul. 2010, JNCA, pp. 1-11 (Year: 2010).*
(Continued)

*Primary Examiner* — Taghi T Arani
*Assistant Examiner* — Gregory A Lane
(74) *Attorney, Agent, or Firm* — Morris, Manning & Martin, LLP; Daniel E. Sineway, Esq.; Adam J. Thompson, Esq.

(57) ABSTRACT

A server device for managing privilege delegation to control execution of commands thereon is described. Execution of a command, according to first privileges, by a remote management (RM) server on the server device is requested from a RM client on a client device. An agent plug-in, chained to a command execution plug-in of the RM server, intercepts the request and forwards related information to an agent service cooperating with an operating system of the server device. The agent service determines whether to execute the command according to second privileges, different from the first privileges and if permitted, delegates the second privileges to the command, and causes, via the agent plug-in chained to the command execution plug-in, the command to be executed according to the second privileges.

20 Claims, 4 Drawing Sheets

(51) Int. Cl.
*G06F 21/53* (2013.01)
*H04L 9/40* (2022.01)
*G06F 9/445* (2018.01)
*H04L 67/564* (2022.01)
*G06F 9/46* (2006.01)

(52) U.S. Cl.
CPC ............ *G06F 21/126* (2013.01); *G06F 21/53* (2013.01); *H04L 63/105* (2013.01); *H04L 67/2819* (2013.01); *G06F 2221/2141* (2013.01); *G06F 2221/2149* (2013.01)

(58) Field of Classification Search
CPC ..... G06F 2221/2141; G06F 2221/2149; H04L 63/105; H04L 67/2819
USPC ............................................................ 726/4
See application file for complete search history.

(56) References Cited

U.S. PATENT DOCUMENTS

| | | | |
|---|---|---|---|
| 6,233,618 B1 | 5/2001 | Shannon | |
| 7,133,904 B1 | 11/2006 | Soyha et al. | |
| 7,219,354 B1 | 5/2007 | Huang et al. | |
| 8,368,640 B2 | 2/2013 | Dardinski et al. | |
| 9,158,662 B1 | 10/2015 | Hanes et al. | |
| 9,769,131 B1 | 9/2017 | Hartley | |
| 10,803,499 B1 | 10/2020 | Davis et al. | |
| 2002/0144137 A1 | 10/2002 | Harrah et al. | |
| 2002/0174256 A1 | 11/2002 | Bonilla et al. | |
| 2004/0133801 A1* | 7/2004 | Pastorelli | G06F 21/121 726/27 |
| 2004/0210771 A1 | 10/2004 | Wood et al. | |
| 2005/0188370 A1 | 8/2005 | Kouznetsov et al. | |
| 2006/0089834 A1 | 4/2006 | Mowatt et al. | |
| 2006/0294103 A1* | 12/2006 | Wood | H04L 41/046 |
| 2007/0180502 A1 | 8/2007 | Yadav et al. | |
| 2007/0198933 A1 | 8/2007 | Van der Bogert et al. | |
| 2008/0060051 A1 | 3/2008 | Lim | |
| 2008/0127322 A1* | 5/2008 | McCall | H04L 41/046 726/11 |
| 2008/0289026 A1 | 11/2008 | Abzarian et al. | |
| 2009/0070442 A1 | 3/2009 | Kacin et al. | |
| 2010/0274366 A1 | 10/2010 | Fata et al. | |
| 2011/0030045 A1 | 2/2011 | Beauregard et al. | |
| 2011/0173251 A1 | 7/2011 | Sandhu et al. | |
| 2011/0196842 A1 | 8/2011 | Timashev et al. | |
| 2011/0239288 A1 | 9/2011 | Cross et al. | |
| 2011/0251992 A1 | 10/2011 | Bethlehem et al. | |
| 2012/0047259 A1 | 2/2012 | Krasser et al. | |
| 2012/0054744 A1 | 3/2012 | Singh et al. | |
| 2012/0066512 A1 | 3/2012 | Kass et al. | |
| 2012/0226742 A1 | 9/2012 | Mornchilov et al. | |
| 2013/0057561 A1 | 3/2013 | Nave et al. | |
| 2013/0339313 A1 | 12/2013 | Blaine et al. | |
| 2014/0279600 A1 | 9/2014 | Chait | |
| 2014/0281528 A1 | 9/2014 | Dubey et al. | |
| 2015/0040181 A1 | 2/2015 | Cook et al. | |
| 2015/0058839 A1 | 2/2015 | Madanapalli et al. | |
| 2015/0074828 A1 | 3/2015 | Beauregard et al. | |
| 2015/0128250 A1 | 5/2015 | Lee et al. | |
| 2016/0057254 A1* | 2/2016 | Arcese | H04L 67/327 709/203 |
| 2016/0203313 A1 | 7/2016 | El-Moussa et al. | |
| 2016/0217159 A1 | 7/2016 | Dahan et al. | |
| 2016/0378962 A1 | 12/2016 | Austin | |
| 2017/0011220 A1 | 1/2017 | Efremov et al. | |
| 2017/0048259 A1 | 2/2017 | Dodge et al. | |
| 2017/0054760 A1 | 2/2017 | Barton et al. | |
| 2017/0111368 A1 | 4/2017 | Hibbert et al. | |
| 2018/0024895 A1 | 1/2018 | Kumarasamy et al. | |
| 2018/0302409 A1 | 10/2018 | Hope | |
| 2019/0121631 A1 | 4/2019 | Hua et al. | |

FOREIGN PATENT DOCUMENTS

| | | |
|---|---|---|
| GB | 2538518 A | 11/2016 |
| GB | 2563066 A | 12/2018 |
| KR | 101308859 B1 | 9/2013 |
| WO | 2006101549 A2 | 9/2006 |
| WO | 2007089786 A2 | 8/2007 |
| WO | 2015183493 A1 | 12/2015 |
| WO | 2018174990 A1 | 9/2018 |

OTHER PUBLICATIONS

Chris Hoffman and Justin Pot; "How to Install Applications on a Mac: Everything You Need to Know"; HowToGeek.com website [full url in ref.]; Jul. 20, 2017 (Year: 2017).
Chris Hoffman; "How to Disable System Integrity Protection on a Mac (and Why You Shouldn't)"; HowToGeek.com website [full url in ref.]; Jul. 5, 2017 (Year: 2017).
Examination Report dated Apr. 29, 2020 for United Kingdom Patent Application No. GB1715628.2.
Examination Report dated Jun. 14, 2019 for United Kingdom Patent Application No. GB1600738.7.
Combined Examination & Search Report dated Feb. 6, 2018 for United Kingdom Patent Application No. GB1714489.0.
Combined Examination & Search Report dated Aug. 1, 2018 for United Kingdom Patent Application No. GB1802241.8.
Combined Examination & Search Report dated Nov. 16, 2018 for United Kingdom Patent Application No. GB 1808380.8.
Combined Examination & Search Report dated Mar. 6, 2019 for United Kingdom Patent Application No. GB1814798.3.
Combined Examination & Search Report dated Dec. 1, 2017 for United Kingdom Patent Application No. GB1708824.6.

\* cited by examiner

MANAGING PRIVILEGE DELEGATION ON A SERVER DEVICE

RELATED APPLICATIONS

This application claims the benefit of priority from GB 1801568.5, filed Jan. 31, 2018, the disclosure of which is incorporated herein by reference in its entirety.

TECHNICAL FIELD

The present invention relates generally to the field of computers and computer devices. More particularly, the present invention relates to a computer device, such as a server device, and to a method of managing privilege delegation to control execution of commands on such a computer device.

BACKGROUND

Generally, there is a need to perform remote management of computer devices in computer networks. For example, there may be a need to perform management (also known as administration), for example diagnosis and/or control, of one computer device, such as a server device, from another computer device, such as a client device. Generally, command shells may be used to query states, for example hardware and/or process states, of computer devices, to execute commands (also known as functions) thereon and to process answers received therefrom, so as to perform the management. For example, a command shell on the client device may be used across a computer network to perform management of the server device. For example, Windows® PowerShell® is used by system administrators in computer networks to perform remote management of different computer devices, such as personal computers, workstations, servers and smart devices.

Generally, it is desirable to implement a least-privilege access security model, where each logged-in user is granted only a minimal set of access privileges by way of their standard user account. This model is particularly helpful for reducing the risk of attacks from malicious software (malware).

A difficulty arises in that a relatively high privilege level, such as local administrator level, is normally required on the managed computer devices in order to perform remote management thereof. This, however, may compromise security of the managed computer devices, for example by exposing vulnerabilities in the computer networks to malicious attacks.

The example embodiments have been provided with a view to addressing at least some of the difficulties that are encountered in current computer systems, whether those difficulties have been specifically mentioned above or will otherwise be appreciated from the discussion herein

SUMMARY

According to the present invention there is provided a computer device, a computer system, a computer-implemented method, and a computer-readable storage medium as set forth in the appended claims. Additional features will be appreciated from the dependent claims, and the description herein.

In one example, there is provided a server device for managing privilege delegation to control execution of commands thereon, the server device including at least a processor and a memory, the server device comprising an operating system, a remote management (RM) server comprising a command execution plug-in and cooperating with the operating system, an agent service cooperating with the operating system, and an agent plug-in cooperating with the agent service, wherein the agent plug-in is chained to the command execution plug-in; wherein the agent plug-in is arranged to intercept a request, from a RM client, originating from a first user account of a logged-in user on a client device to execute a command, by the RM server, in a second user account on the server device, wherein the first user account and the second user account have different first privileges and second privileges assigned thereto respectively; wherein the agent plug-in is arranged to obtain information related to the request and to forward the information to the agent service cooperating with the operating system of the server device; wherein the agent service is arranged to determine whether to execute the command in the second user account on the server device according to the second privileges and to delegate the second privileges to the command, if it is determined to execute the command in the second user account on the server device according to the second privileges; and wherein the agent service is arranged to cause, via the agent plug-in chained to the command execution plug-in, the command to be executed according to the second privileges in the second user account by the operating system on the server device and wherein the agent plug-in is arranged to relay the command from the agent service, having the second privileges delegated thereto, to the command execution plug-in provided by the operating system in the second user account on the server device.

In one example, the agent plug-in is arranged to intercept the request from the first user account of the logged-in user on the client device by exposing a function corresponding to a command execution plug-in function and receiving the request via the exposed function.

In one example, the agent service is arranged to determine whether to execute the command in the second user account on the server device according to the second privileges by examining the information forwarded by the agent plug-in and referencing a policy file.

In one example, the agent service is arranged to determine whether to execute the command in the second user account on the server device according to the second privileges by denying to execute the command in the second user account on the server device according to the second privileges.

In one example, the agent service is arranged to delegate the second privileges to the command by providing a token, having the second privileges assigned thereto, to the agent plug-in in respect of the command.

In one example, the agent plug-in is arranged to relay the command, having the second privileges delegated thereto, to the command execution plug-in provided by the operating system in the second user account on the server device by calling the command execution plug-in function and passing the command, having the second privileges delegated thereto, to the command execution plug-in.

In one example, the agent plug-in is arranged to provide an interface corresponding to a command execution plug-in interface and wherein the agent plug-in is registered with the RM server.

In one example, the agent service is arranged to provide passive handling of the request.

In one example, the agent plug-in is arranged to intercept a connection request, from the RM client, for the logged-in user to connect to the RM server and to control connection of the logged-in user to the RM server.

In one example, there is provided a system comprising a server device and a client device, arranged as set forth herein.

In one example, there is provided a method of managing privilege delegation to control execution of commands on a server device, the method being implemented by hardware of the server device including at least a processor and a memory, the method comprising: intercepting, by an agent plug-in provided on the server device, a request, from a remote management (RM) client, originating from a first user account of a logged-in user on a client device to execute a command, by a RM server, in a second user account on the server device, wherein the first user account and the second user account have different first privileges and second privileges assigned thereto respectively; obtaining, by the agent plug-in, information related to the request and forwarding the information to an agent service cooperating with an operating system of the server device; determining, by the agent service, whether to execute the command in the second user account on the server device according to the second privileges and delegating the second privileges to the command, if it is determined to execute the command in the second user account on the server device according to the second privileges; and causing, by the agent service via the agent plug-in chained to the command execution plug-in, the command to be executed according to the second privileges in the second user account by the operating system on the server device by relaying, by the agent plug-in, the command, having the second privileges delegated thereto, to a command execution plug-in, chained to the agent plug-in, provided by the RM server in the second user account on the server device.

In one example, intercepting, by the agent plug-in provided on the server device, the request from the first user account of the logged-in user on the client device comprises exposing, by the agent plug-in, a function corresponding to a command execution plug-in function and receiving, by the agent plug-in, the request via the exposed function.

In one example, determining, by the agent service, whether to execute the command in the second user account on the server device according to the second privileges comprises examining, by the agent service, the information forwarded by the agent plug-in and referencing, by the agent service, a policy file.

In one example, determining, by the agent service, whether to execute the command in the second user account on the server device according to the second privileges comprises denying to execute the command in the second user account on the server device according to the second privileges.

In one example, delegating the second privileges to the command comprises providing, by the agent service, a token, having the second privileges assigned thereto, to the agent plug-in respect of the command.

In one example, relaying, by the agent plug-in, the command, having the second privileges delegated thereto, to the command execution plug-in provided by the operating system in the second user account on the server device comprises calling, by the agent plug-in, the command execution plug-in function and passing, by the agent plug-in, the command having the second privileges delegated thereto, to the command execution plug-in.

In one example, the method comprises providing, by the agent plug-in, an interface corresponding to a command execution plug-in interface and registering the agent plug-in with the RM server.

In one example, the method comprises passive handling, by the agent service, of the request.

In one example, the method comprises intercepting by the agent plug-in, a connection request, from the RM client, for the logged-in user to connect to the RM server and controlling connection of the logged-in user to the RM server.

In one example, a tangible non-transient computer-readable storage medium is provided having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

The following description includes example embodiments of a mechanism for managing privilege delegation to control execution of commands on a computer device, such as a server device. In at least some examples, the mechanism upholds security of the computer device while enabling execution thereon of commands received from another computer device, such as a client device. Many other advantages and improvements will be appreciated from the discussion herein.

Figure 1:
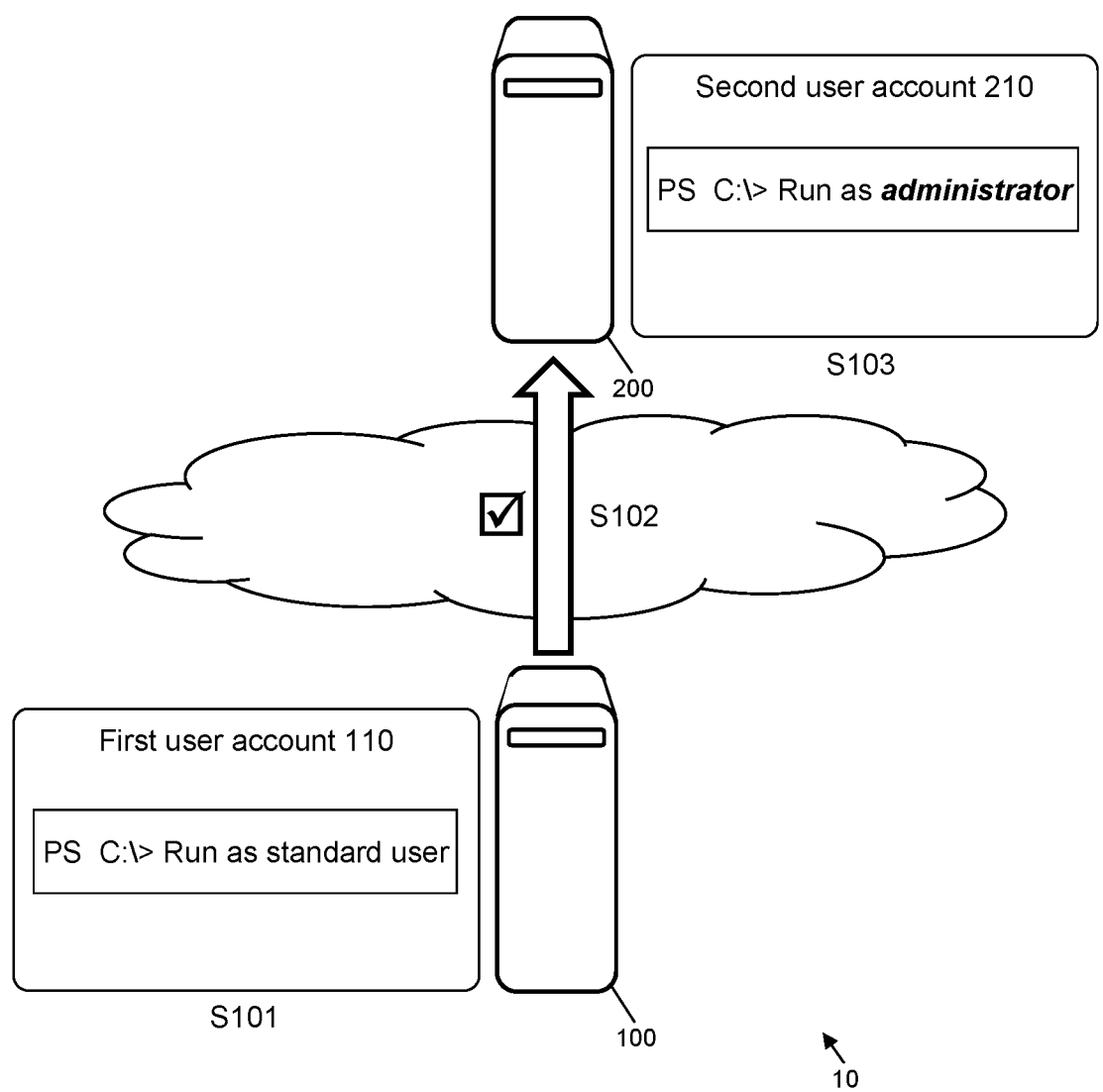
FIG. 1 is a schematic view of an example network including an example computer device.

FIG. 1 is a schematic view of an example network 10 including a first computer device 100 and a second computer device 200. Particularly, the second computer device 200 is an exemplary computer device, configured to manage privilege delegation to control execution of commands thereon. In this way, remote management of the second computer device 200 may be performed from the first computer device 100, across the network 10. Using client-server terminology, the first computer device 100 is a client device (also known as a requesting client device), while the second computer device 200 is a server device (also known as a responding server device). The second computer device 200 (i.e. the server device 200) and the first computer device 100 (i.e. the client device 100) may be interchangeable such that either may comprise, be, and/or behave as a server device or a client device. For simplicity and without limitation, the first computer device 100 is referred to herein as the client device 100 and the second computer device 200 is referred to herein as the server device 200.

The client device 100 comprises a first user account 110 and the server device 200 comprises a second user account 210, as described below in more detail. The first user account 110 and the second user account 210 have different first privileges and second privileges assigned thereto respectively. Via a remote management (RM) client, such as a shell, cooperating with an operating system of the client device 100, as described below in more detail, a logged-in user on the client device 100 may request management tasks, for example commands, to be performed on the server device 200 via a RM server thereon. Particularly, via the RM client on the client device 100, the logged-in user in the first user account 110 on the client device 100 may request management tasks to be performed, via the RM server on the server device 200, in the second user account 210 on the server device 200. In this way, management tasks may be requested from the client device 100 and executed on the server device 200 by an operating system thereof, such as accessing or modifying data in the registry, starting or stopping a process or running a script. Notably, the server device 200 is arranged to determine whether to execute the command in the second user account on the server device 200 according to the second privileges and/or other privileges as required and/or assigned and to cause the command to be executed according to the second privileges and/or the other privileges as required in the second user account 210 by the operating system on the server device 200 accordingly. In this way, management flexibility is improved while opportunities for malicious attacks are restricted.

In use, at S101, the logged-in user on the client device 100 requests from the first user account 110 on the client device 100 to execute a command in the second user account 210 on the server device 200, wherein the first user account 110 and the second user account 210 have different first privileges and second privileges assigned thereto respectively, for example standard user and local administrator privileges respectively. That is, the requested command is associated, at least initially, with the standard user privileges of the logged-in user, as assigned to the first user account 110. For example, using PowerShell as the RM client, the request may be to run a particular command as a standard user.

At S102, the command is transmitted in a request (also known as a message) via the network 10 from the client device 100 to the server device 200. One or more firewalls may be included in the network 10, through which the request is transmitted.

At S103, privileges associated with the requested command are selectively elevated by the server device 200 to the second privileges so as to permit execution of the requested command in the second user account 210 on the server device 200 according to the elevated privileges, without generally elevating the first privileges of the logged-in user and/or requiring a logged-in user having the second privileges. That is, the requested command is now associated with the elevated local administrator privileges required to execute the command in the second user account 210, rather than the original standard user privileges of the logged-in user, as assigned to the first user account 110. For example, using PowerShell as the RM server, the original request to run the particular command as a standard user may instead now be run as an administrator. In this way, the command may be executed on the server device 200, as requested from the client device 100, without exposing vulnerabilities in the computer network 10 to malicious attacks, such as via the first user account 110 having elevated privileges. In this way, security of the server device 200 and/or the client device 100, for example, may be better upheld.

The network 10 may be a private network, a virtual private network, an intranet, a cloud, or the Internet. In practice, computing environments for large-scale corporations will typically include many thousands of coupled individual computer devices 100 (i.e. client devices) and computer devices 200 (i.e. server devices).

Figure 2:
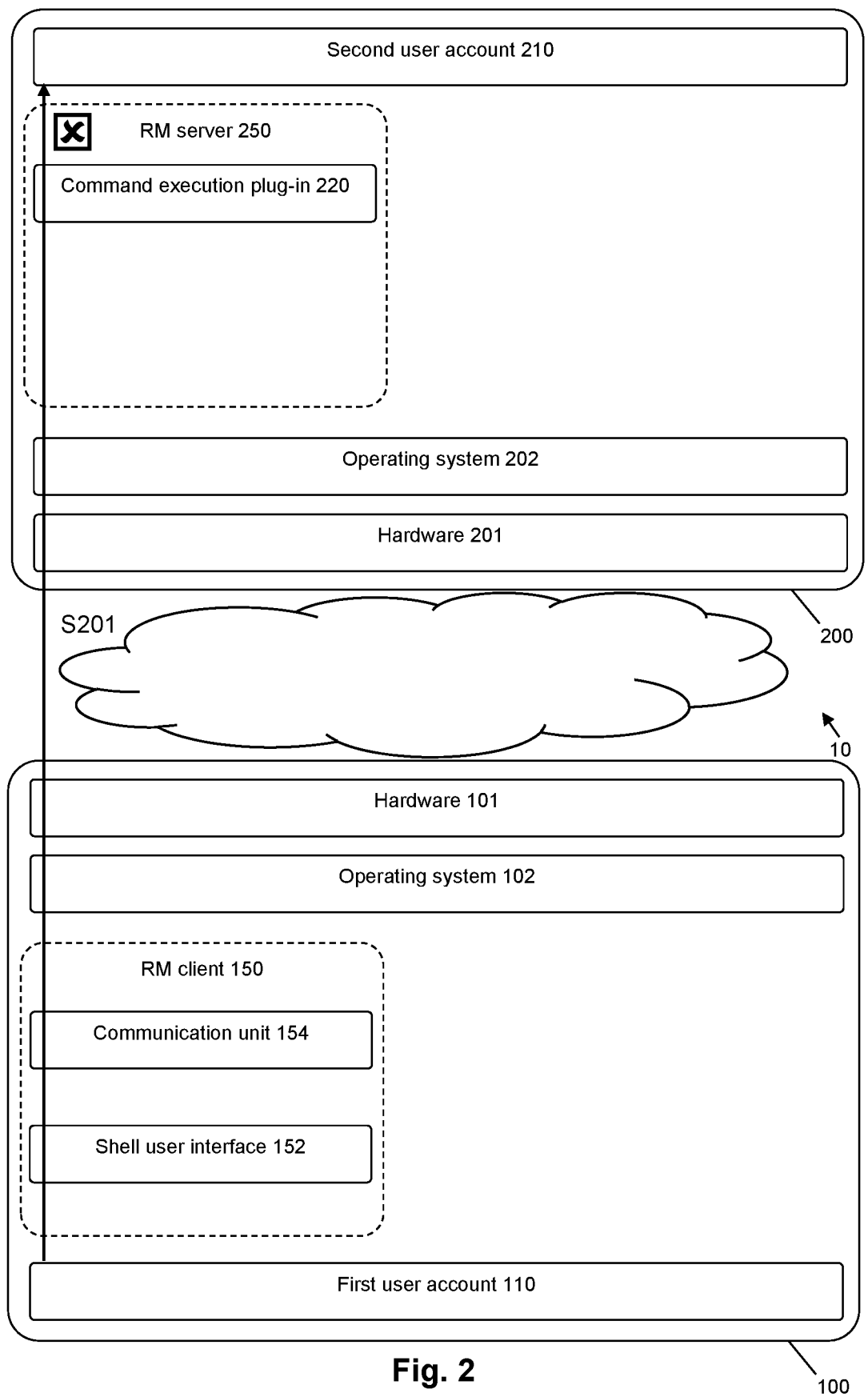
FIG. 2 is a schematic view of the example network including the example computer device in more detail.

FIG. 2 is a schematic view of the example network 10 including the example computer device 200, in more detail.

Some of the example embodiments are discussed in detail in relation to computers and computer devices using the Windows® operating system, as supplied by Microsoft Corporation of Redmond, Wash., USA, under the trade marks Windows NT, Windows 2000, Windows XP, Windows Vista, Windows Server 2003, Windows Server 2008, Windows 7, Windows 8, Windows 10 or later versions, amongst others. However, the teachings, principles and techniques of the present invention are also applicable in other practical embodiments. For example, the described embodiments are also applicable to other operating systems, such as UNIX®, Linux®, mac OS®, iOS® and Android®, and in particular those having a discretionary access control (DAC) security model.

Client Device

The client device 100 may take any suitable form factor. As examples, the client device 100 may be a desktop computer, a portable computing device, laptop, tablet, smartphone, wearable device, or an emulated virtual device on any appropriate host hardware. The client device 100 comprises a layer of hardware (H/W) 101, which suitably includes memory, processors (CPU central processor units), I/O input/output interfaces (e.g. NIC network interface cards, USB universal serial bus interfaces, etc.), storage (e.g. solid state non-volatile storage or hard disk drive), and so on. An operating system 102, for example Windows 10, runs on the hardware layer 101 to provide a runtime environment for execution of user processes and applications. This runtime environment typically provides resources such as installed software, system services, drivers and files.

The client device 100 comprises a remote management (RM) client 150, typically provided as a shell (also known as a command shell), cooperating with the operating system 102. In more detail, the RM client 150 may include a shell user interface 152 and a communication unit 154. Generally, the communication unit 154 is arranged to communicate with other computer devices, such as the server device 200. Generally, the shell user interface 152 is arranged to provide a command-line interface for the logged-in user in the first user account 110, thus allowing the logged-in user to send shell commands over the network 10 to the server device 200 and observe appropriate responses. The shell user interface 152 thus allows the logged-in user (typically an IT professional) to input commands which control operations of the server computer 200 and/or or cause the server computer 200 to obtain and provide desired information about its character, condition, operating state, hardware, installed applications, executing processes, and so on. The shell user interface 152 is usually implemented as a textual command-line interface, although example embodiments with graphical user interfaces are also possible.

An example of the RM client 150 is Windows Power-Shell®, a task automation framework using a command-line shell and associated scripting language. In PowerShell, administrative tasks are generally performed by cmdlets, which are specialized .NET classes implementing a particular operation. The cmdlets work by accessing data in different data stores, such as file systems or registries, which are made available to PowerShell via providers. Sets of cmdlets may be combined into scripts. PowerShell provides access to Windows Management Instrumentation (WMI) and Component Object Model (COM) objects, enabling administrators to perform administrative tasks on both local and remote Windows systems as well as WS-Management and CIM enabling management of remote Linux systems and network devices. PowerShell also provides a hosting application programming interface (API) with which the PowerShell runtime can be embedded inside other applications. These applications can then use PowerShell functionality to implement certain operations, including those exposed via the graphical interface. PowerShell commands may be used to launch standalone executable programs as separate processes. To support scripting, the WinRM Scripting API may be used.

Server Device

The server device 200 may also take any suitable form factor, as described above with respect to the client device 100. As examples, the server device 200 may be a desktop computer, a portable computing device, laptop, tablet, smartphone, wearable device, or an emulated virtual device on any appropriate host hardware. The server device 200 comprises a layer of hardware (H/W) 201, which suitably includes memory, processors (CPU central processor units), I/O input/output interfaces (e.g. NIC network interface cards, USB universal serial bus interfaces, etc.), storage (e.g. solid state non-volatile storage or hard disk drive), and so on. An operating system 202, for example Windows 10, runs on the hardware layer 201 to provide a runtime environment for execution of user processes and applications. This runtime environment typically provides resources such as installed software, system services, drivers, and files.

The server device 200 comprises a remote management (RM) server 250 (also known as a listener or host), arranged to receive requests including one or more shell commands, for example PowerShell functions, cmdlets and/or scripts, from the RM client 150, originating from the first user account 110 of the logged-in user on the client device 100. The shell commands may cause remote management operations which influence an internal operating state of the server device 200, such as starting, or stopping, a process on the server device 200, or causing the server device 200 to be rebooted. Also, the shell commands may obtain information about the internal state of the server device 200, such as accessing the registry, providing a list of files in a directory, obtaining a list of installed applications, or querying event logs. The RM server 250 comprises a command execution plug-in 220. Optionally, the RM server 250 comprises one or more additional plug-ins, in particular to reach Windows Management Instrumentation (WMI) or Component Object Model (COM) objects. These plug-ins are arranged to assist implementation of the received shell commands on the server device 200. The RM server module 250 architecture may reach the hardware layer 201 through a base board management controller (BMC), which may include sensors, such as CPU temperature, fan speed or voltage. These physical sensors provide administrative information which may be fed back to the client device 100, thus allowing remote management of the sever device 200 even at the physical component level. The RM server 250 is arranged to generate responses to the requests, which are returned via the network 10 to the RM client 150 on the client device 100. Generally, under the WS-Management protocol, the requests and responses are formatted to be firewall-friendly messages. That is, the messages are configured to pass easily through one or more firewalls which may be present in the network 10 between the client device 100 and the server device 200.

According to a default or conventional behaviour of the server device 200, the RM server 250 is arranged to receive the requests, including the one or more shell commands, originating from the first user account 110 via the RM client 150 on the client device 100 and to directly act upon these received shell commands. Particularly, according to the default behaviour of the server device 200, the command execution plug-in 220 is arranged to directly receive the request from the RM client 150.

Security Model

Generally, operating systems such as the operating system 102 on the client device 100 and/or the operating system 202 on the server device 200, apply security models wherein access privileges are based on user accounts, such as the user account 110 and/or the user account 210, respectively. The operating systems, via privilege access management services cooperating therewith respectively for example, may define privilege levels appropriate to different classes of users, or groups of users, and then apply the privileges of the relevant class or group to the particular logged-in user (e.g. ordinary user, super-user, local administrator, system administrator and so on). A current user is authenticated such as by logging-in to the client device 100, e.g. with a user identity and password, and these user credentials may be validated locally or via a remote agent service such as a domain controller. The logged-in user, via their previously prepared security account, thus acts as a security principal in the security model on the client device 100. The operating system 102 of the client device 100 then grants privileges, appropriate to the security context of the first user account 110, to processes and commands to be executed in the first user account 110. Particularly, when executing in the first user account 110, the operating system 102 grants privileges to the commands, for example, by default. Similarly, the current user may be authenticated such as by logging-in to the server device 200, e.g. with a user identity and password (which may be the same or different to those for the client device 100), and these user credentials may be validated locally or via a remote agent service such as a domain controller. The logged-in user, via their previously prepared security account, thus acts as a security principal in the security model on the server device 200. The operating system 202 of the server device 200 then grants privileges, appropriate to the security context of the second user account 210, to processes and commands when to be executed in the second user account 210. Again, when executing in the user account 210, the operating system 202 grants privileges to the commands, for example, by default.

When considering privilege management, it is desirable to implement a least-privilege access security model, whereby each user is granted only a minimal set of access privileges for their user account, such as the first user account 110, for example the first privileges. However, many applications and/or commands require a relatively high privilege level, such as a local administrator level, in order to install, operate and/or execute correctly. For example, in order to execute the received shell commands on the server device 200, such relatively high privilege rights may be required. That is, conventionally, such relatively high privilege rights must be granted to the logged-in user in the first user account 110 on the client device 100 so as to be able to execute shell commands in the second user account 210 on the server device 200. Hence, in practice, there is a widespread tendency to grant elevated privilege rights, such as the local administrator level, or a system administrator level, to all members of a relevant user group, such as on the server device 200, and thus allow access to almost all of the resources of computer devices, such as the server device 200. This level of access may be greater than is desirable or appropriate from a security viewpoint. For example, there is a possibility of accidental tampering with the computer devices, leading to errors or corruption within the computer devices. Further, an infection or malware may maliciously access resources of the computer devices with the deliberate intention of subverting security or causing damage, such as by modifying a normal and otherwise harmless application, e.g. to hide a key log to obtain credit card numbers or bank details.

In this example, the first user account 110 and the second user account 210 have different first privileges and second privileges assigned thereto respectively. In one example, the first user account 110 is a standard user account. In one example, the second user account 210 is an administrator account, for example a local administrator account. In one example, the first user account 110 has assigned thereto default standard user privileges (i.e. the first privileges), thereby conforming with the least-privilege access security model. In one example, the second user account 210 has assigned thereto local administrator privileges (i.e. the second privileges), such that shell commands may be executed in the second user account 210, provided that the logged-in user is a member of an appropriate group so as to be granted the required local administrator privileges. However, this difference in privilege level between the first privileges and the second privileges means that conventionally, requests including shell commands received by the RM server 250 from the first user account 110 via the RM client 150 are denied according to the requirement for local administrator user privileges in the second user account 210, as shown schematically at S201, because the first privileges associated with the first user account 110 are lower than required.

Agent

Figure 3:
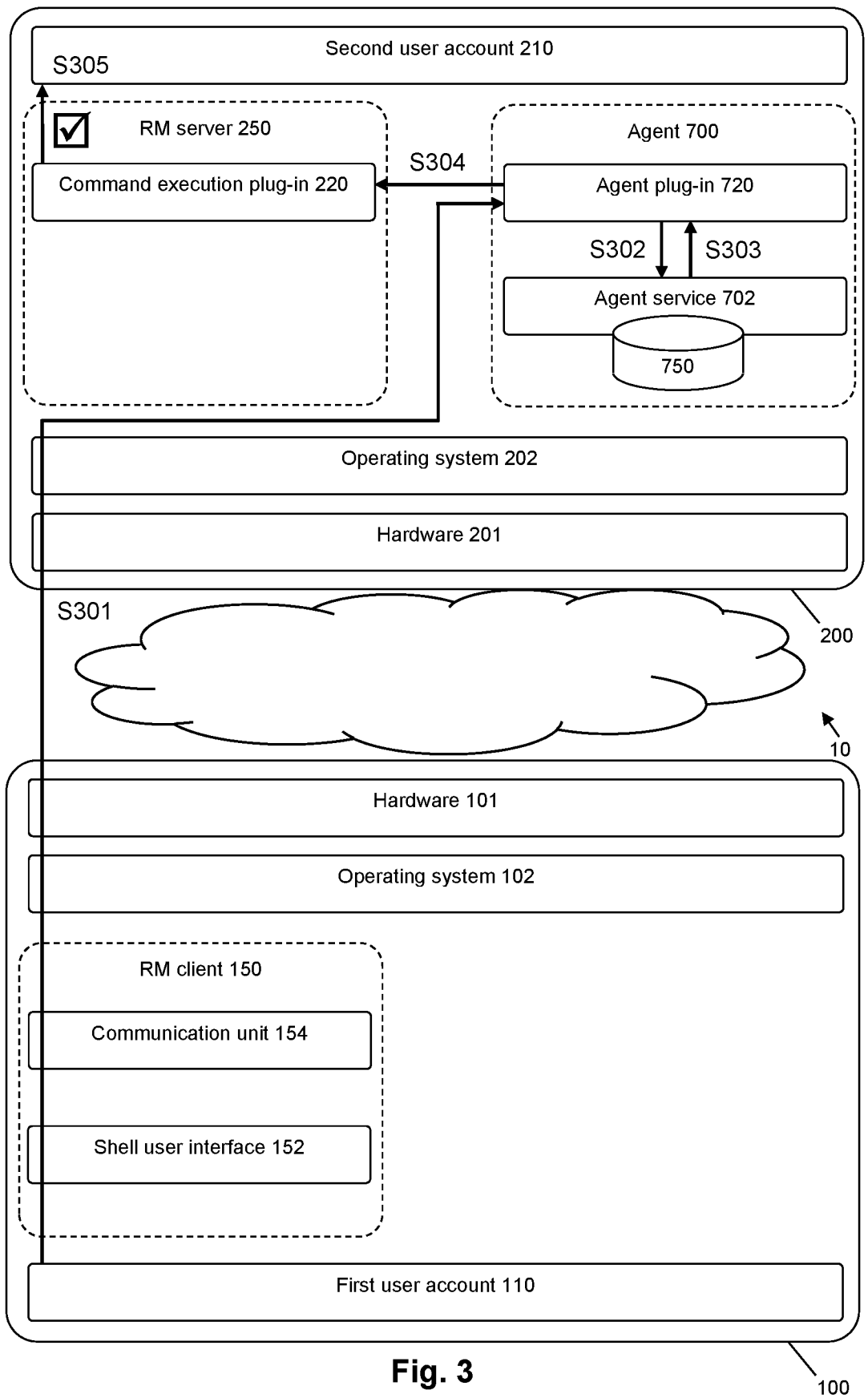
FIG. 3 is a schematic view of the example network including the example computer device in more detail.

FIG. 3 is a schematic view of the example network 10 including the example server device 200, in more detail.

In this example, the server device 200 further comprises an agent 700, configured to operate in cooperation with the operating system 202. Particularly, the agent 700 enables the logged-in user in the first user account 110, having standard user privileges, to execute shell commands on the server device 200 by selectively allowing the shell commands to be executed according to elevated privileges required for their execution, in contrast to the conventional behaviour described with reference to FIG. 2, particularly S201. The agent 700 may comprise one or more software and/or hardware modules, such as executables, dynamic link libraries (DLLs), plug-ins, add-ins, add-ons or extensions. In this example, the agent 700 supports core capabilities for security of the computer device 200. In particular, the agent 700 suitably implements at least a privilege management function and an application control function. The agent 700 thus acts as a secure gatekeeper to control activity on the server device 200 in addition to, and in cooperation with, the existing security mechanisms of the operating system 202.

In the context of Windows operating systems, the agent 700 comprises an agent service 702 cooperating with the operating system 202, as described below in more detail. The agent service 702 may act as a core module or kernel component. In a macOS environment, the agent 700 may comprise a daemon, which runs as a background process on the server device 200. The agent 700 further comprises an agent plug-in 720 cooperating with the agent service 702, as described below in more detail. Generally, plug-ins are also known as plugins, add-ins, addins, add-ons, addons, or extensions.

In this example, the server device 200 further comprises the agent 700, comprising the agent service 702 cooperating with the operating system 202 and the agent plug-in 720 cooperating with the agent service 702. It should be understood that in this example, the agent 700 comprises the agent service 702 and the agent plugin 720. However, this example is not limiting and other implementations are possible. For example, the agent 700 may be configured to provide any of the functionality of the agent service 702 and/or the agent plugin 720. For example, more or fewer software components may be provided to provide the functionality of the agent 700.

The agent plug-in 720 is arranged to intercept a request from the first user account 110 of a logged-in user on the client device 100 to execute a command in the second user account 210 on the server device 200. That is, in contrast to the default behaviour of the server device 200, in which the RM server 250 would otherwise receive the request, the request is instead intercepted by the agent plug-in 720 and not directly received by the RM server 250. In one example, the agent plug-in 720 is arranged to intercept the request before receipt thereof by the RM server 250. Thus, the agent 700 thereby interrupts the default behaviour of the server device 200. Notably, the agent plug-in 720 is chained to the command execution plug-in 220 that is otherwise arranged to receive the request according to a default behaviour of the server device 200. By chaining the agent plug-in 720 to the command execution plug-in 220, not only is the request received first by the agent plug-in 720 instead of the command execution plug-in 220, but additionally, the interception is permitted by the operating system 202 and/or the RM server 250. This contrasts with conventional mechanisms of interception, such as hooking, which may be denied by the operating system 202 and/or the RM server 250 as potentially malicious actions, consistent with security signatures of malware, for example.

The agent plug-in 720 is arranged to obtain information related to the request and to forward the information to the agent service 702 cooperating with the operating system 202 of the server device 200. In one example, the agent plug-in 720 is arranged to obtain details, for example metadata, of the first user account 110, for example the user identity of the logged-in user of the first user account 110 and/or the first privileges thereof. In one example, the agent plug-in 720 is arranged to obtain the command included in the request. In one example, the agent plug-in 720 is arranged to obtain a token and/or information relating to the token, wherein the token is associated with the command. Tokens are described in more detail below. In one example, the agent plug-in 720 is arranged to forward the details of the first user account and/or the command included in the request and/or the associated token to the agent service 702.

In one example, the agent plug-in 720 is arranged to intercept the request from the first user account 110 of the logged-in user on the client device 100 by exposing a function, for example a function through which the command is passed, corresponding to a command execution plug-in function of the command execution plug-in 220 and receiving the request via the exposed function. In this way, the agent plug-in 720 may receive the request in preference to (i.e. before, instead of) the command execution plug-in 220. It should be understood that exposing a function (for example, an executable method) comprises, consists of and/or is providing, by the agent plug-in 720, the function, such as a public function or a protected function, corresponding to the command execution plug-in function of the command execution plug-in 220, for example in an interface (for example, an exposed interface) thereof.

In Microsoft Windows, the agent plug-in 720 may be arranged to expose a function through which all commands are conventionally passed by the command execution plug-in 220:

```
VOID WSManPluginCommand (WSMAN_PLUGIN_REQUEST *,
    DWORD, PVOID, PCWSTR,
        WSMAN_COMMAND_ARG_SET *);
```

As all commands pass through the WSManPluginCommand function, this is when the agent service 702 may determine whether to execute the command in the second user account 210 on the server device 200 according to the second privileges, as described below in more detail.

In one example, the agent plug-in 720 is arranged to provide an interface corresponding to a command execution plug-in interface of the command execution plug-in 220. That is, the agent plug-in 720 may provide the same interface provided by the command execution plug-in 220, such that the agent plug-in 720 may behave as, comprise and/or be a proxy for the command execution plug-in 220. In this way, the agent plug-in 720 may receive the request, all requests and/or all messages in preference to (i.e. before, instead of) the command execution plug-in 220. In one example, the agent plug-in 720 is an agent proxy plug-in 720 for the command execution plug-in 220. In one example, the agent plug-in 720 is arranged to expose all functions, for example all public functions, exposed by the command execution plug-in 220. In this way, the RM server 250 may communicate (i.e. interact) directly with the agent plug-in 720, rather than with the command execution plug-in 220.

In Microsoft Windows, the agent plug-in 720 may be arranged to provide an interface corresponding to the command execution plug-in interface by exporting one, a plurality and/or all of the following functions:

```
DWORD WSManPluginStartup (DWORD, PCWSTR, PCWSTR, PVOID *);
DWORD WSManPluginShutdown (PVOID, DWORD, DWORD);
VOID WSManPluginShell (PVOID, WSMAN_PLUGIN_REQUEST *, DWORD,
    WSMAN_SHELL_STARTUP_INFO *, WSMAN_DATA *);
VOID WSManPluginReleaseShellContext (PVOID);
VOID WSManPluginCommand (WSMAN_PLUGIN_REQUEST *, DWORD, PVOID, PCWSTR,
    WSMAN_COMMAND_ARG_SET *);
VOID WSManPluginReleaseCommandContext (PVOID, PVOID);
VOID WSManPluginSend (WSMAN_PLUGIN_REQUEST *, DWORD, PVOID, PVOID,
    PCWSTR, WSMAN_DATA *);
VOID WSManPluginReceive (WSMAN_PLUGIN_REQUEST *, DWORD, PVOID, PVOID,
    WSMAN_STREAM_ID_SET *);
VOID WSManPluginSignal (WSMAN_PLUGIN_REQUEST *, DWORD, PVOID, PVOID,
    PCWSTR);
VOID WSManPluginConnect (WSMAN_PLUGIN_REQUEST *, DWORD, PVOID, PVOID,
    WSMAN_DATA*);
DWORD(WINAPI * WSManPluginOperationComplete (WSMAN_PLUGIN_REQUEST *,
    DWORD, DWORD, PCWSTR);
```

In one example, the agent plug-in 720 is arranged to resolve the command, for example a path for the command on the server device 200. In one example, the agent plug-in 720 is arranged to resolve the command by forwarding the command to the command execution plugin 220, wherein the command execution plugin 220 resolves the command and returns a response. In one example, the agent plug-in 720 is arranged to load the command execution plugin 220.

In Microsoft Windows, PowerShell relies the command execution plug-in 220 to resolve the command. For example, if a path is not specified for a command, PowerShell defaults to a precedence order when executing the command: alias; function; cmdlet; native window command. To resolve the command, the command execution plugin 220 pwrshplugin.dll is typically used by PowerShell, which may be loaded by calling:
LoadLibrary(L"C:
\\Windows\\System32\\pwrshplugin.dll");

In one example, the agent plug-in 720 is chained (also known as daisy-chained) to the command execution plug-in 220. In this way, messages such as, the request including the command, may be forwarded between the agent plug-in 720 and the command execution plug-in 220. In one example, the agent plug-in 720 is arranged to receive the request before the command execution plug-in 220.

In one example, the agent plug-in 720 is registered with the RM server 250. In this way, chaining of the agent plug-in 720 to the command execution plug-in 220 may be provided while enabling the agent plug-in 720 to receive the request before the command execution plug-in 220. In one example, registering the agent plug-in 720 with the RM server 250 comprises identifying a file, for example providing a location of an XML document, defining a configuration of the agent plug-in 720.

In Microsoft Windows, registering a WinRM plugin (i.e. the agent plug-in 720) is typically performed by using a particular shell command:
'winrm create http://schemas.microsoft.com/wbem/wsman/1/config/plugin?name=MyPlugIn-file:C:\myplugin.xml'
where 'name=MyPlugIn' is the name of the agent plug-in 720, and '-file:C:\myplugin.xml' points to the location of an XML document defining a configuration of the agent plug-in 720. The configuration includes Path and Sddl attributes. The attribute Path points to the agent plug-in 720 binary file, for example a DLL. The attribute Sddl must contain a security identifier of any user or user group that should be allowed to connect to the server device 200. This particular shell command inserts a registry entry under a particular tree:

HKLM\SOFTWARE\Microsoft\Windows\CurrentVersion\WSMAN\Plugin\MyPlugin
This key contains exactly one entry by the name of ConfigXML. The contents of this registry value are the contents of the XML document. In this way, a standard user may be granted access to the server device 200 via PowerShell remoting, contrary to a default behaviour of the server device 200.

In one example, the agent plug-in 720 is arranged to intercept a connection request, from the RM client 150, for the logged-in user to connect to the RM server 250. In one example, the agent plug-in 720 is arranged to control connection of the logged-in user to the RM server 250. In one example, the agent plug-in 720 is arranged to permit the logged-in user to connect to the RM server 250 by default and the agent service 702 is arranged to determine, for example restrict, whether the logged-in user is permitted to execute the requested command via the RM server 250. In this way, the agent service 702 may control which specific users may connect to the RM server 250 and hence execute specific commands via the RM server 250 on the server device 200. While permitting the logged-in user to connect to the RM server 250 by default may appear counterintuitive, thereby circumventing security provisions of the RM server 250, the agent service 702 may restrict both specific users and specific commands, thereby increasing security while providing control at more refined granularity. Furthermore, if the logged-in user and/or the requested command do not conform to the policy file 750, for example, the request command is denied by default, thereby upholding the security of the server device 200. In other words, a specific command requested by a specific user may be permitted while the same command requested by another user may be denied. Conversely, another command requested by the specific user may be denied while the same command requested by the another user may be permitted. Furthermore, while the specific command requested by the specific user may be permitted, a subsequent request for the same command by the same specific user may be denied, or vice versa.

In Microsoft Windows, the SDDL value may be set to a value, for example ExactMatch="False", which allows all users to connect to PowerShell on the server device 200.

The agent service 702 is arranged to determine whether to execute the command in the second user account 210 on the server device 200 according to the second privileges.

In Microsoft Windows, based on the determination of the agent service 702, the original WSManPluginCommand of the command execution plug-in 220 pwrshplugin may be called, or the command may be blocked, as described below in more detail.

In one example, the agent service 702 is arranged to determine whether to execute the command in the second user account 220 on the server device 200 according to the second privileges by examining the information forwarded by the agent plug-in 720 and referencing a policy file 750, as described below in more detail.

In one example, the agent service 702 is arranged to determine whether to execute the command in the second user account 210 on the server device 200 according to the second privileges by denying to execute (i.e. blocking) the command in the second user account 210 on the server device 200 according to the second privileges. In one example, a specific command is blacklisted (i.e. blocked). In one example, a specific command is whitelisted (i.e. permitted). In one example, the agent service 702 is arranged to inform the RM client 150 that the command has been successfully executed, if the command is blocked. In one example, a specific user, user account and/or user group is blacklisted (i.e. blocked). In one example, a specific user, user account and/or user group is whitelisted (i.e. permitted). In one example, agent service 702 is arranged to inform the RM client 150 that the command has been successfully executed, if the specific user, user account and/or user group is blocked.

In Microsoft Windows, if the command is blocked by the agent service 702, the RM client 150 may be instead informed that the command has been successfully executed by calling WSManPluginOperationComplete exported by wsmsvc.dll.

The agent service 702 is arranged to delegate the second privileges to the command, if it is determined to execute the command in the second user account 210 on the server device 200 according to the second privileges. In other words, the agent service 702 may selectively enable access to higher privilege levels, such as a local administrator level, when needed to perform certain tasks, such as execute the command. Thus the agent 700 provides the privilege level to perform a specific task, but does not provide a general high level privilege to the first user account 110. Conversely, the agent service 702 may downgrade the privilege level, so that certain tasks are carried out at a privilege level lower than that of the first user account 110. It should be understood that by delegating the second privileges to the command, the agent service 702 provides the second privileges thereto, for example by replacing the first privileges with the second privileges.

In one example, the agent service 702 is arranged to delegate the second privileges to the command by providing a token (also known as an access token), having the second privileges assigned thereto, to the agent plug-in 720 in respect of the command. In one example, the token is an impersonation token. In one example, the agent plug-in 720 is arranged to replace an original token, having the second privileges assigned thereto, associated with the command with a token having the second privileges assigned thereto.

Generally, access tokens are objects that describes the security contexts of respective processes or threads. The tokens include the identities and privileges of the respective user accounts associated with the processes or threads. For example, when a user logs in to a user account on a computer device, the computer device verifies the user's password by comparing the password with information stored in a security database. If the password is authenticated, the computer device produces an access token. Every process executed on behalf of this user has a copy of this access token. The computer device uses the access token (or copy thereof) to identify the user when a thread interacts with a securable object or tries to perform a task that requires privileges. Generally, the access tokens include the following information: a security identifier (SID) of the user account; SIDs for groups of which the user is a member; a logon SID that identifies the current logon session; a list of the privileges held by either the user or the user's groups; an owner SID; an SID for the primary group; a default discretionary access control list (DACL) that the computer device uses when the user creates a securable object without specifying a security descriptor; a source of the token; whether the token is a primary or impersonation token; an optional list of restricting SIDs; current impersonation levels; and other statistics. Every process has a primary token that describes the security context of the user account associated with the process. By default, the system uses the primary token when a thread of the process interacts with a securable object. Moreover, a thread can impersonate a client account. Impersonation allows the thread to interact with securable objects using the client's security context. A thread that is impersonating a client has both a primary token and an impersonation token.

In one example, the command is executed on a thread arranged to impersonate the first user account 110. In one example, the thread originates from the RM server 250 on the server device 200. A single thread or multiple threads may be used from the RM server 250 to call one or more functions exposed by the agent plug-in 720, wherein the functions correspond to respective command execution plug-in functions. If it is determined to execute the command in the second user account 210 on the server device 200 according to the second privileges, the thread may be provided with a token, having the second privileges assigned thereto, by the agent plug-in 720 and as provided to the agent plug-in 720 by the agent service 702, as described above. By calling, by the agent plug-in 720, the respective command execution plug-in function of the command execution plugin 220 using the thread provided with the token, having the second privileges assigned thereto, the command is thus executed according to the second privileges in the second user account 210.

The agent service 702 is arranged to cause, via the agent plug-in 720 chained to the command execution plug-in 220, the command to be executed according to the second privileges in the second user account 220 by the operating system 202 on the server device 200. The agent plug-in 720 is arranged to relay the command from the agent service 702, having the second privileges delegated thereto, to the command execution plug-in 220 provided by the operating system 202 in the second user account 210 on the server device 200.

In one example, the agent plug-in 720 is arranged to relay the command, having the second privileges delegated thereto, to the command execution plug-in 220 provided by the operating system 202 in the second user account 210 on the server device 200 by calling the command execution plug-in function and passing the command, having the second privileges delegated thereto, to the command execution plug-in 220. In one example, the agent plug-in 720 is arranged to relay the command, provided with a token having the second privileges assigned thereto, to the command execution plug-in 220.

In one example, the client device 100 is a remote client device 100. That is, the client device 100 is physically remote from the server device 200. For example, the client device 100 and the server device 200 may be situated in different offices, on different floors of a building, in different buildings, in different cities or different countries. For example, the client device 100 may be a mobile client device 100 and the server device 200 may be a static server device 200, or vice versa. Alternatively, both the client device 100 and the server device 200 may be static or mobile. For example, the mobile client device 100 may be in motion, such as moving in a car, train or aeroplane. In one example, the server device 200 is a remote server device 200.

Passive Handling

In one example, the agent 700, for example the agent service 702 and/or the agent plug-in 720, is arranged to provide passive handling of the request. In this case, the request is forwarded as received (i.e. without determination, evaluation and/or modification) to the RM server 250, as the originally intended recipient. Any responses from the RM server 250 may be returned transparently. In one example, passive handling is defined by the policy file 750. The agent 700 can meanwhile audit those requests which were handled passively, again consistent with the policy file 750, as described below in more detail. This passive handling function allows the request to proceed according to the default behaviour of the server device 200 while the requesting user process or application is unaware of the agent 700 as an intermediary. Advantageously, the default behaviour of the server device 200 is maintained for those requests that the agent 700 determines should have passive handling. Also, there is now a fail-safe option, in that the server device 200 will maintain an expected behaviour for requests, commands and/or actions that are passively handled. This passive handling is useful particularly in the event that a particular user or request is not specified in the policy file 750, because default behaviour is still enacted. Hence, the server device 200 can now quickly and safely supersede the original behaviour for particular or specific situations, allowing rapid responses and network-wide consistency when needed, while still enabling existing legacy functionality and behaviour to continue in place for other actions, users and/or devices, as appropriate.

Policy File

In one example, the agent 700 is coupled to a policy file 750. In one example, the agent service 702 is coupled to the policy file 750. The policy file 750 stores a set of policies (also known as rules) which define responses of the agent 700 to requested actions or tasks. A policy server may be provided to make policy decisions based on the policy file 750. Suitably, the policy server is provided as a service locally on the server device 200 which links to other components of the agent 700. That is, the policy server may reside as a component within the agent 700, or may be implemented as a separate service that is communicably linked to the agent 700. The policy server may operate by receiving a policy request message, concerning a requested action and related meta-information, and returning a policy result based thereon. In one example, the agent 700 is configured to capture a set of identities, and may then provide these identities as part of the policy request. Such identities may include, for example, a user identity (UID) of the first user account 110 and/or the second user account 210, a group identity (GID) of a group to which the first user account 110 and/or the second user account 210 belongs, a process identity (PID) of a current process which has initiated the action or task in question, and/or a process identity of any parent process (PPID). Suitably, the policy server determines an outcome for the request based on the provided set of identities relevant to the current policy request.

In one example, the policy file 750 is a structured file, such as an extensible mark-up language XML file. The policy file 750 is suitably held locally on the host device 200, ideally in a secure system location which is accessible to the agent 700 and/or the policy server as appropriate, but which is not accessible by the first user account 110 and/or the second user account 210. Updates to the policy file 750 may be generated elsewhere on the network 10, such as by using a management console on another server, and then pushed, or pulled, to each instance of the agent 700 on each device 200. The policy file 750 is readily updated and maintained, ensuring consistency for all devices across the network. In this way, the agent 700 is robust and manageable for a large-scale organisation with many thousands of individual computer devices 200. Also, the agent 700 is able to leverage rules which have been developed in relation to application control, such as defining user groups or user roles and related application permissions, and now extend those same rules also to privilege management, and vice versa.

Once the agent plug-in 720 has intercepted the request, information related to the user account 210 and the requested command, for example, are forwarded to the agent service 702. Suitably, this information is then evaluated against the rules in the policy file 750 as evaluated by the agent plug-in 720.

The policy file 750 allows policies to be created at any suitable level of granularity. Thus, policies may be defined by command type, wherein only certain types of command may be given elevated privilege levels. For example, a result is determined by type of command (e.g. this user can request information but cannot alter running processes, or vice versa). As an illustrative example, a "dir" command to list the content of files in a directory is allowed to pass through and uses the original privilege level of this user. Thus, the command "dir c:/windows" is allowed to pass through. By contrast, a command to "kill process XXX" which terminates a particular named process "XXX" is controlled to performed with local administrator rights. Where the identified user is allowed to perform this remote management operation, then the policy unit will show that this particular type of command is to be given elevated privileges. As another example, the authorisation result may be specific to individual remote management operations (e.g. this user can kill processes whose name begin with the letter "P" but not those beginning with the letter "W").

In general, evaluating the rules by the agent service 702 may produce one of a predetermined set of outcomes. In one instance, permission should be given to execute the requested command. In another instance, the requested command should be blocked. In a third instance, a specific rule does not exist, or the rules check returns an indication to operate in the passive-handling mode as already explained above.

Custom Messaging

In one example, the agent 700 is configured to perform custom messaging. In particular, the agent 700, whether acting directly or via a cooperating proxy or plug-in, may present a message dialog to the logged-in user via the first user account 110. This message dialog may be presented in a terminal from which a current action of interest was invoked by or on behalf of the user. Thus, the custom messaging may be presented on a display of the client device 100 for interaction with the logged-in user. Input from the logged-in user may be returned to the agent 700 for evaluation. Hence, the agent 700 is able to interact with the user with a rich set of customizable messages.

In one example, the custom messaging may include at least one of a confirmation, a challenge-response, and a reason. In more detail, the confirmation may present a dialog which receives a binary yes/no type response, allowing the user to confirm that they do indeed wish to proceed and providing an opportunity to double-check the intended action. The custom messaging conveniently allows specific text, e.g. as set by the policy file 750, to be included in the dialog, such as reminding the user that their request will be logged and audited. As another option, the custom messaging may provide specific block messages, explaining to the user why their request has been blocked, thus enabling improved interaction with the user.

In one example, the custom messaging may require additional authentication to be presented by the logged-in user in order to proceed with the request. As an example, the additional authentication may require the logged-in user to again enter their username and password credentials, or may involve one or more of the many other forms of authentication (e.g. a biometric fingerprint or retinal scan) as will be appreciated by those skilled in the art. The challenge-response also allows alternate forms of authentication to be employed, such as a two-factor authentication. In one example, the challenge-response requires entry of a validation code, which might be provided such as from a second device or an IT helpdesk.

In one example, the reason allows the logged-in user to provide feedback concerning the motivation for their request, e.g. by selecting amongst menu choices or entering free text. Logging the reasons from a large set of users allows the network 10 to be administered more efficiently in future, such as by setting additional rules in the policy file 750 to meet the evolving needs of a large user population.

Notably, custom messaging allows the agent 700 to provide a rich and informative set of interactions with the logged-in users. Each of these individual custom messaging actions may be defined in the policy file 750. The custom messaging may eventually result in a decision to allow or block the requested action. An appropriate allow or block operation is then carried out as required.

Auditing

In one example, the agent 700 is arranged to perform auditing in relation to at least certain requests. The auditing may include recording the customised messaging, if any, and may include recording an outcome of the request. Audit reports may be extracted or uploaded from each server device 200 and/or each client device 100. Each of these auditing functions may be defined in the policy 750.

Method of Managing Privilege Delegation

At S301, the agent plug-in 720, provided on the server device 200, intercepts the request, from the RM client 150, originating from the first user account 110 of the logged-in user on the client device 100 to execute, by the RM server 250, the command in the second user account 210 on the server device 200, wherein the first user account 110 and the second user account 210 have different first privileges and second privileges assigned thereto respectively.

At S302, the agent plug-in 720 obtains information related to the request and forwards the information to the agent service 702 cooperating with the operating system 102 of the server device 200.

At S303, the agent service 702 determines whether to execute the command in the second user account 210 on the server device 200 according to the second privileges and delegates the second privileges to the command, if it is determined to execute the command in the second user account 210 on the server device 200 according to the second privileges.

At S304, the agent service 702 causes, via the agent plug-in 720 chained to the command execution plug-in 220, the command to be executed according to the second privileges in the second user account 210 by the operating system 202 on the server device 200. The agent plug-in 720 relays the command, having the second privileges delegated thereto, to a command execution plug-in 220, chained to the agent plug-in 720, provided by the RM server 250 in the second user account 210 on the server device 200.

At S305, the command execution plug-in 220 provided by the operating system 202 in the second user account 210 on the server device 200 requests the operating system 202 to execute the command, having the second privileges delegated thereto.

Figure 4:
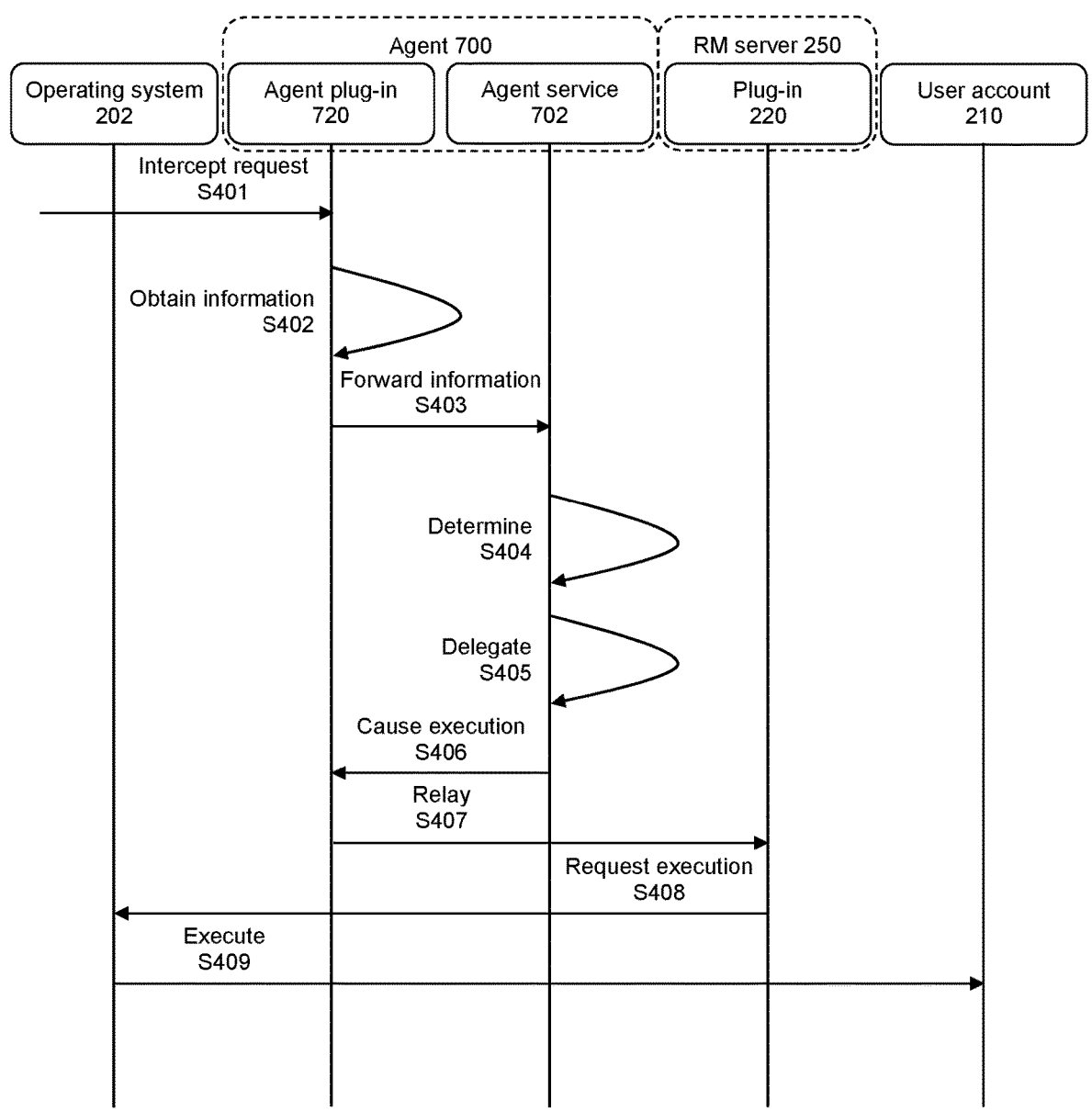
FIG. 4 is a flowchart of an example method of operating the example computer device.

FIG. 4 is a flowchart of an example method of operating the example server device 200, as described above. The method is of managing privilege delegation to control execution of commands on the computer device 200. This example method may include any of the steps described herein.

At S401, an agent plug-in 720, provided on the server device 200, intercepts a request, from a remote management (RM) client 150, originating from a first user account 110 of a logged-in user on a client device 100 to execute a command, by a RM server 250, in a second user account 210 on the server device 200, wherein the first user account 110 and the second user account 210 have different first privileges and second privileges assigned thereto respectively.

Intercepting, by the agent plug-in 720 provided on the server device 200, the request from the first user account 110 of the logged-in user on the client device 100 may comprise exposing, by the agent plug-in 720, a function corresponding to a command execution plug-in function and receiving, by the agent plug-in 720, the request via the exposed function.

At S402, the agent plug-in 720 obtains information related to the request.

At S403, the agent plug-in 720 forwards the information to an agent service 702 cooperating with an operating system 202 of the server device 200.

At S404, the agent service 702 determines whether to execute the command in the second user account 210 on the server device 200 according to the second privileges.

Determining, by the agent service 702, whether to execute the command in the second user account 210 on the server device 200 according to the second privileges may comprises examining, by the agent service 702, the information forwarded by the agent plug-in 720 and referencing, by the agent service 702, the policy file 750.

Determining, by the agent service 702, whether to execute the command in the second user account 210 on the server device 200 according to the second privileges may comprise denying to execute the command in the second user account 210 on the server device 200 according to the second privileges.

At S405, the agent service 702 delegates the second privileges to the command, if it is determined to execute the command in the second user account 210 on the server device 200 according to the second privileges.

Delegating the second privileges to the command may comprises providing, by the agent service 702, a token, having the second privileges assigned thereto, to the agent plug-in 720 in respect of the command.

At S406, the agent service 702 causes, via the agent plug-in 720 chained to the command execution plug-in 220, the command to be executed according to the second privileges in the second user account 210 by the operating system 202 on the server device 200.

At S407, the agent plug-in 720 relays the command, having the second privileges delegated thereto, to a command execution plug-in 220, chained to the agent plug-in 720, provided by the RM server 250 in the second user account 210 on the server device 200.

Relaying, by the agent plug-in 720, the command, having the second privileges delegated thereto, to the command execution plug-in 220 provided by the operating system 202 in the second user account 210 on the server device 200 may comprise calling, by the agent plug-in 720, the command execution plug-in function and passing, by the agent plug-in 720, the command having the second privileges delegated thereto, to the command execution plug-in 220.

At S408, the command execution plug-in 220 provided by the operating system 102 in the second user account 210 on the server device 200 requests the operating system 102 to execute the command, having the second privileges delegated thereto.

At S409, the operating system 102 executes the command, having the second privileges delegated thereto, in the second user account 210 on the server device 200.

In summary, a server device for managing privilege delegation to control execution of commands thereon is described. Execution of a command, according to first privileges, by a remote management (RM) server on the server device is requested from a RM client on a client device. An agent plug-in, chained to a command execution plug-in of the RM server, intercepts the request and forwards related information to an agent service cooperating with an operating system of the server device. The agent service determines whether to execute the command according to second privileges, different from the first privileges and if permitted, delegates the second privileges to the command, and causes, via the agent plug-in chained to the command execution plug-in, the command to be executed according to the second privileges. A system, a method and a CRM are also described.

As will now be appreciated from the discussion herein, the example method, the server device and the system (e.g. the network) have many benefits and advantages. In particular, execution of shell commands on the server device is managed more securely and with more refined granularity, while enhancing the user experience. Advantageously, the least-privilege access security model is maintained even in a remote management network. The logged-in user may be assigned relatively low level privileges on the client device and on the server device by default. Required privileges associated with a requested command are temporarily and selectively elevated by the agent, suitably with per command-granularity. Thus, commands which need higher privilege level are still able to execute on the server device, without assigning relatively higher privileges to user accounts. Furthermore, specific privileges may be associated with each requested command and/or each user, providing more granular control of the server device than provided for conventionally.

The present mechanism has many benefits across a diverse population of users. Users having standard user privileges on server devices are now able to execute commands thereon in the usual way using standard operating system functionality, without being specifically assigned to a user group having required privileges on those server devices, thereby reducing administration burden and increasing flexibility.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

What is claimed is:

1. A server device for managing privilege delegation to control execution of commands thereon, the server device comprising:
a processing circuit;
a memory;
an operating system; and
a remote management (RM) server comprising:
a command execution plug-in cooperating with the operating system;
an agent service cooperating with the operating system; and
an agent plug-in cooperating with the agent service, wherein the agent plug-in is chained to the command execution plug-in and is; arranged to:
intercept a request, from a RM client, originating from a first user account of a logged-in user on a client device to execute a command, by the RM server, in a second user account on the server device, wherein the first user account and the second user account have different first privileges and second privileges assigned thereto respectively; and
obtain information related to the request and to forward the information to the agent service cooperating with the operating system of the server device; and
wherein the agent service is arranged to:
determine whether to execute the command in the second user account on the server device according to the second privileges and to associate the second privileges with the command, if it is determined to execute the command in the second user account on the server device according to the second privileges; and
cause, via the agent plug-in chained to the command execution plug-in, the command to be executed according to the second privileges in the second user account by the operating system on the server device and wherein the agent plug-in is arranged to relay the command from the agent service, having the second privileges associated therewith, to the command execution plug-in provided by the operating system in the second user account on the server device.

2. The server device according to claim 1, wherein the agent plug-in is arranged to intercept the request from the first user account of the logged-in user on the client device by exposing a function corresponding to a command execution plug-in function and receiving the request via the exposed function.

3. The server device according to claim 1, wherein the agent service is arranged to determine whether to execute the command in the second user account on the server device according to the second privileges by examining the information forwarded by the agent plug-in and referencing a policy file.

4. The server device according to claim 1, wherein the agent service is arranged to determine whether to execute the command in the second user account on the server device according to the second privileges by denying to execute the command in the second user account on the server device according to the second privileges.

5. The server device according to claim 1, wherein the agent service is arranged to associate the second privileges with the command by providing a token, having the second privileges assigned thereto, to the agent plug-in in respect of the command.

6. The server device according to claim 5, wherein the agent plug-in is arranged to relay the command, having the second privileges associated therewith, to the command execution plug-in provided by the operating system in the second user account on the server device by calling a command execution plug-in function and passing the command, having the second privileges associated therewith, to the command execution plug-in.

7. The server device according to claim 1, wherein the agent plug-in is arranged to provide an interface corresponding to a command execution plug-in interface and wherein the agent plug-in is registered with the RM server.

8. The server device according to claim 1, wherein the agent service is arranged to provide passive handling of the request.

9. The server device according to claim 1, wherein the agent plug-in is arranged to intercept a connection request, from the RM client, for the logged-in user to connect to the RM server and to control connection of the logged-in user to the RM server.

10. A system comprising:
a server device comprising:
a processor circuit;
a memory;
an operating system; and
a remote management (RM) server comprising:
a command execution plug-in and cooperating with the operating system;
an agent service cooperating with the operating system; and
an agent plug-in cooperating with the agent service, wherein the agent plug-in is chained to the command execution plug-in;
wherein the agent plug-in is arranged to:
intercept a request, from a RM client, originating from a first user account of a logged-in user on a client device to execute a command, by the RM server, in a second user account on the server device, wherein the first user account and the second user account have different first privileges and second privileges assigned thereto respectively; and
obtain information related to the request and to forward the information to the agent service cooperating with the operating system of the server device;
wherein the agent service is arranged to:
determine whether to execute the command in the second user account on the server device according to the second privileges and to associate the second privileges with the command, if it is determined to execute the command in the second user account on the server device according to the second privileges; and
cause, via the agent plug-in chained to the command execution plug-in, the command to be executed according to the second privileges in the second user account by the operating system on the server device and wherein the agent plug-in is arranged to relay the command from the agent service, having the second privileges associated therewith, to the command execution plug-in provided by the operating system in the second user account on the server device; and a client device comprising:
  a RM client; and
  a first user account of a logged-in user, wherein the request is from a RM client, originating from the first user account of the logged-in user on the client device.

11. A method of managing privilege delegation to control execution of commands on a server device, the method being implemented by hardware of the server device including at least a processor and a memory, the method comprising:
  intercepting, by an agent plug-in provided on the server device, a request, from a remote management (RM) client, originating from a first user account of a logged-in user on a client device to execute a command, by a RM server, in a second user account on the server device, wherein the first user account and the second user account have different first privileges and second privileges assigned thereto respectively;
  obtaining, by the agent plug-in, information related to the request and forwarding the information to an agent service cooperating with an operating system of the server device;
  determining, by the agent service, whether to execute the command in the second user account on the server device according to the second privileges and associating the second privileges with the command, if it is determined to execute the command in the second user account on the server device according to the second privileges; and
  causing, by the agent service via the agent plug-in, the command to be executed according to the second privileges in the second user account by the operating system on the server device by relaying, by the agent plug-in, the command, having the second privileges associated therewith, to a command execution plug-in, chained to the agent plug-in, provided by the RM server in the second user account on the server device.

12. The method according to claim 11, wherein intercepting, by the agent plug-in provided on the server device, the request from the first user account of the logged-in user on the client device comprises exposing, by the agent plug-in, a function corresponding to a command execution plug-in function and receiving, by the agent plug-in, the request via the exposed function.

13. The method according to claim 11, wherein determining, by the agent service, whether to execute the command in the second user account on the server device according to the second privileges comprises examining, by the agent service, the information forwarded by the agent plug-in and referencing, by the agent service, a policy file.

14. The method according to claim 11, wherein determining, by the agent service, whether to execute the command in the second user account on the server device according to the second privileges comprises denying to execute the command in the second user account on the server device according to the second privileges.

15. The method according to claim 11, wherein associating the second privileges with the command comprises providing, by the agent service, a token, having the second privileges assigned thereto, to the agent plug-in in respect of the command.

16. The method according to claim 15, wherein relaying, by the agent plug-in, the command, having the second privileges associated therewith, to the command execution plug-in provided by the operating system in the second user account on the server device comprises calling, by the agent plug-in, a command execution plug-in function and passing, by the agent plug-in, the command having the second privileges associated therewith, to the command execution plug-in.

17. The method according to claim 11, comprising providing, by the agent plug-in, an interface corresponding to a command execution plug-in interface and registering the agent plug-in with the RM server.

18. The method according to claim 11, comprising passive handling, by the agent service, of the request.

19. The method according to claim 11, comprising intercepting by the agent plug-in, a connection request, from the RM client, for the logged-in user to connect to the RM server and controlling connection of the logged-in user to the RM server.

20. A tangible non-transitory computer-readable storage medium having recorded thereon instructions which, when implemented by hardware of a server device including at least a processor and a memory, control the server device to:
  intercept, by an agent plug-in provided on the server device, a request, from a remote management (RM) client, originating from a first user account of a logged-in user on a client device to execute a command, by a RM server, in a second user account on the server device, wherein the first user account and the second user account have different first privileges and second privileges assigned thereto respectively;
  obtain, by the agent plug-in, information related to the request and forwarding the information to an agent service cooperating with an operating system of the server device;
  determine, by the agent service, whether to execute the command in the second user account on the server device according to the second privileges and associating the second privileges with the command, if it is determined to execute the command in the second user account on the server device according to the second privileges; and
  cause, by the agent service via the agent plug-in chained to a command execution plug-in, the command to be executed according to the second privileges in the second user account by the operating system on the server device by relaying, by the agent plug-in, the command, having the second privileges associated therewith, to a command execution plug-in, chained to the agent plug-in, provided by the RM server in the second user account on the server device.

* * * * *